United States Patent
Mazur et al.

[11] Patent Number: 5,906,393
[45] Date of Patent: May 25, 1999

[54] OCCUPANT RESTRAINT SYSTEM AND CONTROL METHOD WITH VARIABLE SENSE, SAMPLE, AND DETERMINATION RATES

[75] Inventors: Joseph F. Mazur, Washington; Brian K. Blackburn, Rochester; Scott B. Gentry, Romeo, all of Mich.

[73] Assignees: TRW Inc.; TRW Vehicle Safety Systems Inc., both of Lyndhurst, Ohio

[21] Appl. No.: 08/931,602

[22] Filed: Sep. 16, 1997

[51] Int. Cl.$^6$ ................................................. B60R 21/32
[52] U.S. Cl. .......................... 280/735; 701/45; 180/268; 180/273
[58] Field of Search .......................... 280/735; 180/268, 180/273; 701/45; 340/436, 438

[56] References Cited

U.S. PATENT DOCUMENTS

| | | | |
|---|---|---|---|
| 5,071,160 | 12/1991 | White et al. | 280/735 |
| 5,074,583 | 12/1991 | Fujita et al. | 280/735 |
| 5,172,790 | 12/1992 | Ishikawa et al. | 280/735 |
| 5,232,243 | 8/1993 | Blackburn et al. | 280/735 |
| 5,330,226 | 7/1994 | Gentry et al. | 280/735 |
| 5,338,063 | 8/1994 | Takeuchi et al. | 280/735 |
| 5,400,867 | 3/1995 | Müller et al. | 180/268 |
| 5,411,289 | 5/1995 | Smith et al. | 280/735 |
| 5,413,378 | 5/1995 | Steffens, Jr. et al. | 280/735 |
| 5,436,838 | 7/1995 | Miyamori | 701/46 |
| 5,454,591 | 10/1995 | Mazur et al. | 280/735 |
| 5,530,649 | 6/1996 | Fujishima | 701/46 |
| 5,590,904 | 1/1997 | Ellis et al. | 280/735 |
| 5,802,479 | 9/1998 | Kithil et al. | 701/45 |

OTHER PUBLICATIONS

U.S. application No. 08/931,132, Blackburn, et al. for Occupant Restraint System and Control Method with Variable Sensor Rate and/or Sample Rate, filed Sep. 16, 1997.

*Primary Examiner*—Peter C. English
*Attorney, Agent, or Firm*—Tarolli, Sundheim, Covell, Tummino & Szabo

[57] ABSTRACT

An occupant restraint system (10), and an associated control method, for a vehicle (16). The system (10) includes an actuatable occupant restraint device (18) which has an adjustable aspect. An ultrasound sensor (34) senses an occupant condition at a sense rate and provides a signal (38) indicative of the sensed occupant condition. An ultrasound signal sampler function (46) of a controller (26) samples the signal (38) at a sample rate. A restraint control determination function (50) of the controller (26) makes determinations regarding control of the restraint device (18) at a determination rate using the signal samples. A weight sensor (56) and at least one seat belt sensor (58, 60) sense occupant conditions (e.g., occupant weight and seat belt status) and provide indicative signals (66, 68, 70) to a rates determination function (84) of the controller (26). The rates determination function (84) determines the sense, sample and determination rates in response to the sensed occupant conditions.

17 Claims, 3 Drawing Sheets

OCCUPANT RESTRAINT SYSTEM AND CONTROL METHOD WITH VARIABLE SENSE, SAMPLE, AND DETERMINATION RATES

TECHNICAL FIELD

The present invention is directed to a vehicle occupant restraint system and is particularly directed to control of variable aspects within the system.

BACKGROUND OF THE INVENTION

Occupant restraint systems for use in vehicles are known in the art. One type of restraint system includes an actuatable inflatable restraint module which has an inflatable restraint that is commonly referred to as an air bag. The restraint module is actuated and the air bag is inflated within a vehicle passenger compartment upon the occurrence of a vehicle crash condition for which a vehicle occupant is to be restrained.

A sensor detects a parameter which is indicative of a vehicle crash condition and provides a signal indicative thereof to a controller of the system. In response to a collision-indicating signal from the crash sensor, the controller provides an actuation signal to cause actuation of the restraint module upon a determination of a deployment crash condition.

In one example, the crash sensor is an accelerometer that provides an electrical signal having a value functionally related to the vehicle's crash acceleration. Within the controller, the accelerometer's signal is sampled and an evaluation of the information contained within the sampled signal is used to determine whether the signal is indicative of a deployment crash condition.

Restraint modules having one or more adjustable aspects to enhance performance of the restraint module are also known. Such a restraint module is commonly referred to as a "smart restraint." For example, in the inflatable restraint module, the dynamic deployment profile of the air bag is adjustable. Specifically, the inflation timing, the inflation pressure, and the positioning of the inflating air bag are all known adjustable aspects. Adjustment of the restraint module is based upon sensed occupant conditions.

As occupant restraint systems become more complex, a greater number of sensors are used to sense a greater number of vehicle and occupant conditions. The great number of sensory inputs are used in algorithms to make control determinations for the restraint module. Increases in the sampling and evaluating of sensory information increases the evaluation time of the system or increases the need for a faster, more powerful, and more expensive controller. It is desirable to control sense rate and the sample rate of data and control evaluation rate of the data so that a less expensive controller can be used in the restraint system while providing the desired level of control capability.

SUMMARY OF THE INVENTION

The present invention provides an occupant restraint system for a vehicle. The system includes an actuatable occupant restraint device. First sensor means senses a first occupant condition at a sense rate and provides a sensed signal indicative of the sensed occupant condition. Means samples the sensed signal at a sample rate. Determination means makes determinations regarding control of the restraint device at a determination rate using the signal samples. Second sensor means senses a second occupant condition. Variation means varies at least one of the signal rate, the sample rate, and the determination rate in response to the second sensed occupant condition.

In accordance with another aspect, the present invention provides a method for controlling an actuatable occupant restraint device of an occupant system for a vehicle. A first occupant condition is sensed at a sense rate. A sensed signal indicative of the first sensed occupant condition is provided. The sensed signal is sampled at a sample rate. Determinations are made regarding control of the restraint device at a determination rate using the signal samples. A second occupant condition is sensed. At least one of the sense rate, the sample rate, and the determination rate is varied in response to the second sensed occupant condition.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1:
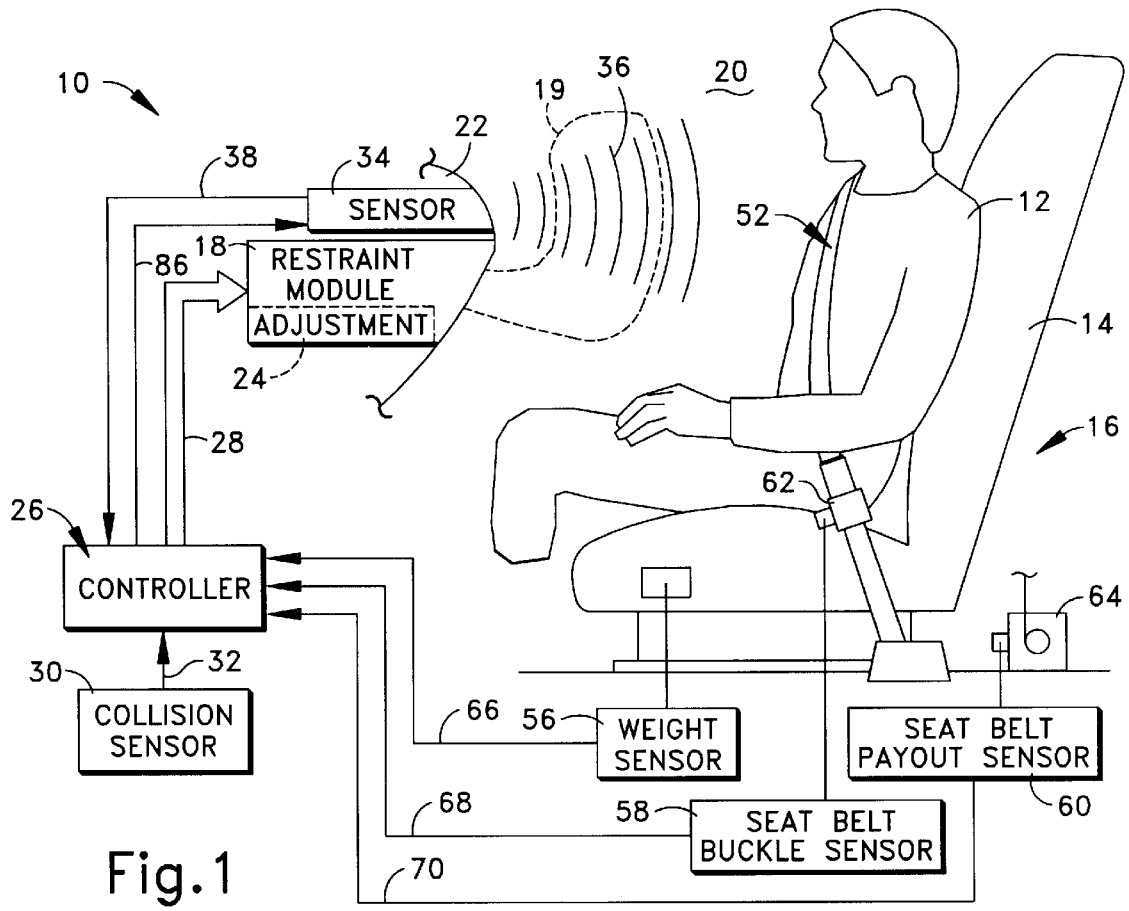
FIG. 1 is a schematic illustration of an occupant restraint system in accordance with the present invention.

An occupant restraint system 10 is schematically illustrated in FIG. 1. The system 10 is provided for an occupant 12 seated on a vehicle seat 14 within a vehicle 16. The system 10 includes an actuatable occupant restraint device 18. In one preferred embodiment, the restraint device 18 is an inflatable restraint module which includes an inflatable restraint 19, commonly referred to as an air bag. The air bag 19 is inflatable within an occupant compartment 20 of the vehicle 16. Hereinafter, the restraint device 18 is referred to as the restraint module 18.

In the illustrated example, the restraint module 18 is located within a dashboard 22 of the vehicle 16 and is associated with the front passenger seat 14. It will be appreciated by a person of ordinary skill in the art that the restraint module 18 may be another type of inflatable restraint module (e.g., a driver's side restraint module) and may be located elsewhere with the vehicle (e.g., on the steering wheel). Also, it will be appreciated that the system 10 may include a plurality of restraint devices and that the system may include an actuatable restraint device other than an inflatable restraint module, such as a seat belt system with an actuatable portion (e.g., a pretensioner) or an actuatable knee bolster.

The restraint module 18 has at least one adjustable aspect 24 which is controllable to adjust actuation of the restraint module. For example, the dynamic deployment profile of the air bag is adjusted, e.g., rate of inflation. Examples of deployment adjustment include adjustment of inflation timing, adjustment of inflation pressure, and adjustment of location of the inflated air bag relative to the occupant 12. A specific example of adjustment to inflation timing is selection of a time period between a determination to actuate the restraint module 18 and an initiation of air bag inflation. A specific example of adjustment of inflation pressure is selection of a pressure threshold for a pressure relief valve which vents the air bag. A specific example of adjustment of air bag positioning is selection of a location relative to a torso of the occupant 12 for placement of the inflated air bag. The positioning is accomplished by directing inflation fluid into the air bag in predetermined zones within the air bag or by re-pointing the entire restraint module via moving devices. Another specific example of adjustment of air bag positioning is moving the entire restraint module toward or away from the occupant and/or moving the occupant toward or away from the restraint module.

Control of the adjustable aspect 24 of the restraint device 18 is by a controller 26 which provides control signals 28 to the restraint device. In one example, the controller 26 is a microcomputer. The controller 26 receives sensory input from several sources and, using the sensory input, makes determinations for control of the restraint device 18.

A sensor 30 senses a vehicle condition for which the occupant 12 is to be restrained and provides a signal 32 to the controller 26 indicative of the sensed vehicle condition. In one example, which is illustrated in the figures, the sensor 30 is referred to as a collision or crash sensor and senses a vehicle crash condition. In an embodiment of such an example, the collision sensor 30 is an accelerometer and the signal 32 is an electrical signal indicative of the sensed crash acceleration. Other examples of sensor inputs include vehicle speed, closing speed with an object, closing angle and vehicle rollover. It should be appreciated by a person of ordinary skill in the art that the system 10 could have a plurality of sensors 30 providing signals 32 to the controller 26 which are indicative of vehicle conditions for which are useful in a determination as to whether the occupant 12 is to be restrained. Hereinafter, only the single collision sensor 30 and its output signal 32 are discussed.

An ultrasound sensor 34 senses at least one occupant characteristic. Occupant characteristics are one type of occupant conditions. Examples of occupant characteristics are: presence of an occupant, size of the occupant, and position of the occupant. Hereinafter, the one or more occupant characteristics which are sensed by the ultrasound sensor 34 are referred to collectively as the occupant characteristic.

In order to sense an occupant characteristic, the ultrasound sensor 34 is energized to transmit an ultrasonic energy pulse signal 36 toward an occupant seat position (e.g., toward the seat 14), and is de-energized to cease the transmission. If the occupant 12 is present on the seat 14, the ultrasonic energy pulse is reflected from the occupant 12 back toward the ultrasound sensor 34. Otherwise the ultrasound energy pulse is reflected from the vehicle interior (e.g., the seat back). The ultrasound sensor 34 receives the reflected ultrasonic energy pulse and generates a signal 38 indicative of the sensed occupant characteristic. For example, the signal 38 is indicative of the elapsed time between the pulse transmission and the reflected pulse reception. Elapsed time is proportional to the distance between the ultrasound sensor 34 and the occupant 12. The signal 38 indicative of a returned pulse is provided to the controller 26. The ultrasound sensor 34 transmits the ultrasonic energy pulse signal 36 and provides the signal 38 indicative of the return pulse at a rate which is referred to as a sense rate. In one example, the sense rate has a period on the order of milliseconds.

The ultrasound sensor 34 is illustrated as being located within the dashboard 22 of the vehicle 16. A person of ordinary skill in the art will appreciate that the ultrasound sensor 34 may be located at any other suitable location within the vehicle 16 for directing the ultrasonic energy signal 36 toward the occupant position. For example, the ultrasound sensor 34 may be located in the back of the seat 14. Also, a person of ordinary skill in the art will appreciate that more that one sensor may be used to sense the occupant characteristic and/or that another type of sensor may be used to sense an occupant condition. For example, an infrared sensor, a seat array sensor, or a camera may be used.

Based upon the input signals 32 and 38 the controller 26 provides the control signals 28 to the restraint module 18. Specifically, the controller 26 includes a collision signal sampler function 42 which samples the signal 32 from the collision sensor 30. Each time the signal 32 is sampled, one or more signal values of the signal 32 are "read." Examples of signal values include a voltage value of the signal 32 and a frequency value of the signal 32. Sampling of the signal 32 by the collision signal sampler function 42 occurs at a collision signal sample rate. In one example, the collision signal sample rate has a period on the order of milliseconds. The collision signal sampler function 42 outputs a signal 44 which is indicative of the read (i.e., sampled) collision signal value(s).

The controller 26 further includes an ultrasound signal sampler function 46 which samples the signal 38 from the ultrasound sensor 34. Each time the signal 38 is sampled, one or more signal values of the signal 38 are "read." Sampling of the signal 38 by the ultrasound signal sampler function 46 occurs at an ultrasound sample rate. In one example, the ultrasound sample rate has a period on the order of milliseconds. The ultrasound signal sampler function 46 outputs a signal 48 which is indicative of the read (i.e., sampled) ultrasound signal value(s).

The signals 44 and 48 are provided to a restraint control determination function 50 which utilizes information regarding the sensed vehicle condition contained within the signal value of the signal 32 and the information regarding the sensed occupant characteristic contained within the signal value of the signal 38 to make determinations regarding control of the restraint module 18. For example, the restraint control determination function 50 utilizes the information regarding occupant position in an algorithm to determine a dynamic inflation profile of the air bag upon inflation of the air bag. At least a portion of the restraint control determination function 50 runs at a rate of operation. In the example in which the dynamic inflation profile control algorithm is performed, the rate of operation is related to the rate at which the algorithm is repeatedly performed. The operation rate is thus the rate at which the determinations are made. In one example, the operation rate of the restraint control determination function 50 (i.e., the determination rate) has a period on the order of milliseconds.

It is to appreciated that the information regarding the sensed vehicle condition contained within the signal value of the signal 32 and the information regarding the sensed occupant characteristic contained within the signal value of the signal 38 are processed together to make the determinations or are processed separately to make different determinations. For example, the information regarding the sensed occupant characteristic contained within the signal value of the signal 38 is processed alone to make determinations regarding adjustment control of the restraint module 18. Also, the information regarding the sensed vehicle condition contained within the signal value of the signal 32 is processed alone to make a determination regarding initiation of actuation of the restraint module 18.

The sensor and sample rates, and the determination rate are adjustable to adjust the overall operation of the system 10. Adjustment of the sensor and sample rates and/or the determination rate is done in response to at least one sensed occupant characteristic. The adjustment of the sensor and sample rates and/or the determination rate tailors the performance of the system 10 to the occupant 12 seated on the seat 14 associated with the system 10.

Each occupant condition which is sensed to provide for control of the adjustment of the sensor and sample rates and/or the determination rate is related to the efficient utilization of the system's control capabilities. For example, the position of an occupant need not be updated at a high frequency if the occupant is not likely to have frequent movement. Thus, the system 10 need not be burdened to update the occupant position at a high frequency. Reducing the amount of unnecessary position updating reduces the system burden thereby freeing the system for other control functions.

Figure 3:
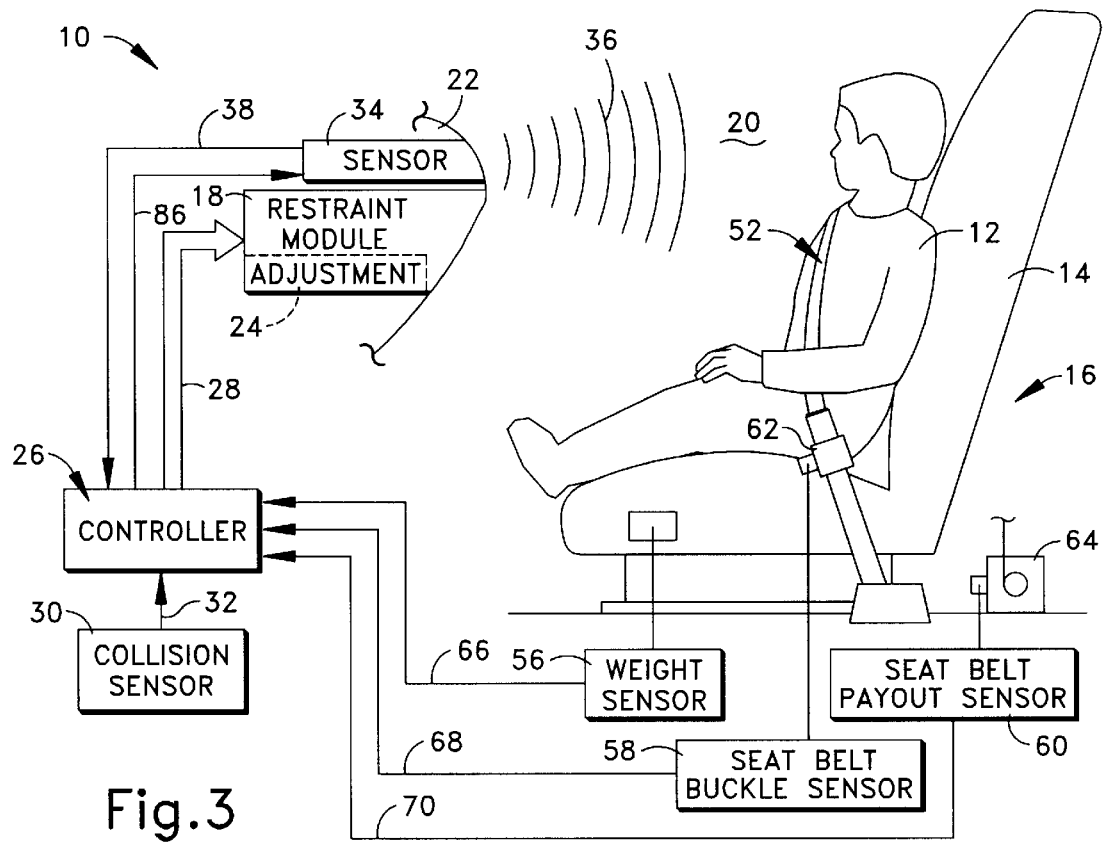
FIGS. 3 and 4 are illustrations of the restraint system of FIG. 1 with different occupant types within a vehicle.

In the example regarding the likelihood of occupant movement, an occupant secured by a seat belt system 52 is less likely to have frequent movement relative to the vehicle interior than an occupant who is not secured by a seat belt system. Also, a relatively heavy occupant (FIG. 1) is less likely to have frequent movement relative to the vehicle interior during a vehicle collision than a relatively light occupant (FIG. 3) because of increased inertia and the frictional interface between the heavy occupant and the seat. Further, it is unlikely that a child occupant (FIG. 4) secured in a rearward facing infant seat (RFIS) 54 will have frequent movement relative to the vehicle interior. Sensed movements around the RFIS 54 are commonly the result of an arm of an adult reaching to tend to the secured child (e.g., providing a milk bottle to the child), and are not the result of the secured child.

In order to sense further occupant characteristics used in the control of the adjustment of the sensor and sample rates for sensor 34 and/or the determination rate in the illustrated embodiment, a weight sensor 56 (FIG. 1) and two seat belt sensors 58 and 60 are provided. The weight sensor 56 senses the weight of the occupant 12 upon the seat 14. In one example, the weight sensor 56 includes a strain gauge. The resistivity of the strain gauge varies dependent upon the amount of force applied to the strain gauge because of the occupant's weight on the seat. In the illustrated embodiment, the weight sensor 56 is preferably located within a bottom seat portion of the seat 14. The weight sensor 56 provides a signal 66 indicative of the weight of the occupant 12 to the controller 26.

The seat belt sensors 58 and 60 sense whether the occupant 12 is secured by the seat belt system 52 and also sense the type of occupant seated on the seat 14. Specifically, the first seat belt sensor 58 is a buckle sensor. The buckle sensor 58 senses whether a tongue secured to the seat belt webbing is latched within a buckle 62 of the seat belt system 52. In one example of the buckle sensor 58, the sensor includes a switch mechanism which completes a circuit when the seat belt is buckled.

Figure 4:
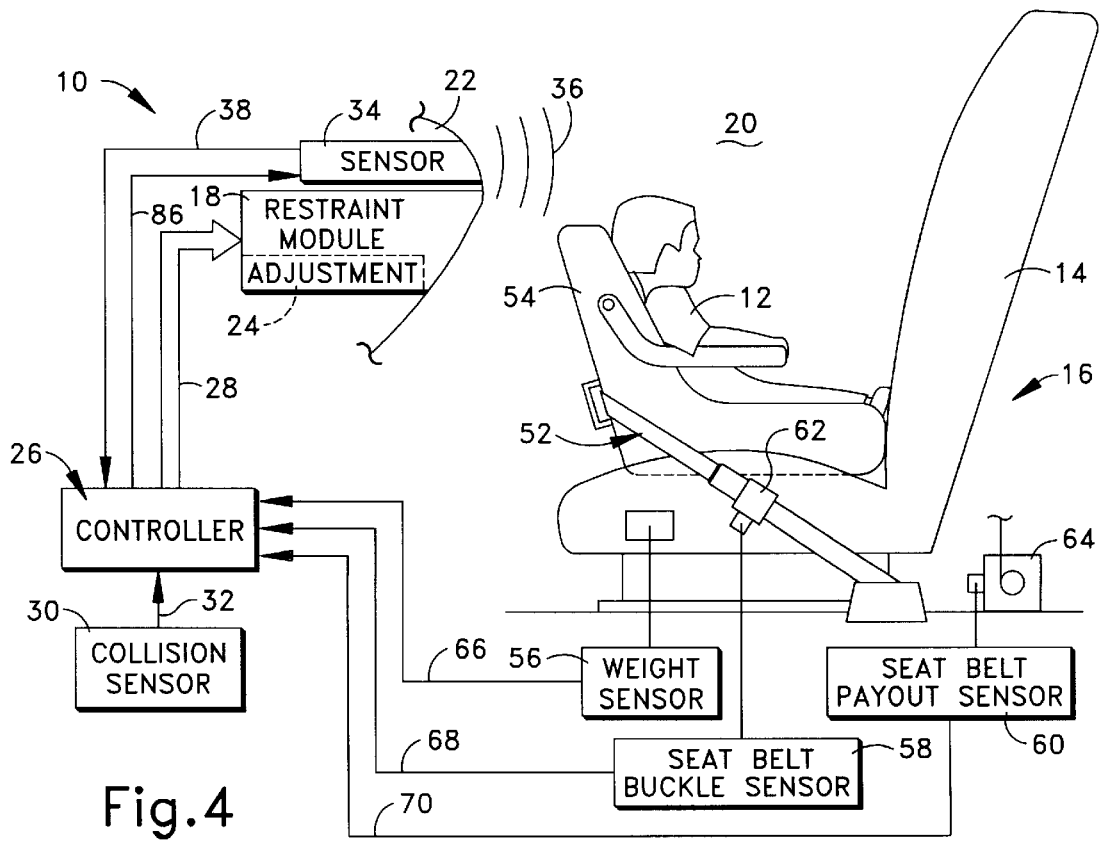

The second seat belt sensor 60 is a webbing payout sensor. The payout sensor 60 senses the amount of seat belt webbing withdrawn from a retractor 64 of the seat belt system 52. The amount of webbing withdrawn is indicative of the type of occupant. Specifically, a relatively large amount of seat belt webbing is withdrawn from the retractor 64 (i.e., a large belt payout) to secure the RFIS 54 (FIG. 4).

The buckle sensor 58 provides a signal 68 to the controller 26 which is indicative of whether the seat belt is secured across the occupant 12. The payout sensor 60 provides a signal 70 to the controller 26 which is indicative of amount of webbing which is withdrawn. Thus, the signal 70 is indicative of at least certain occupant types or characteristics (e.g., a child in the RFIS 54).

Figure 2:
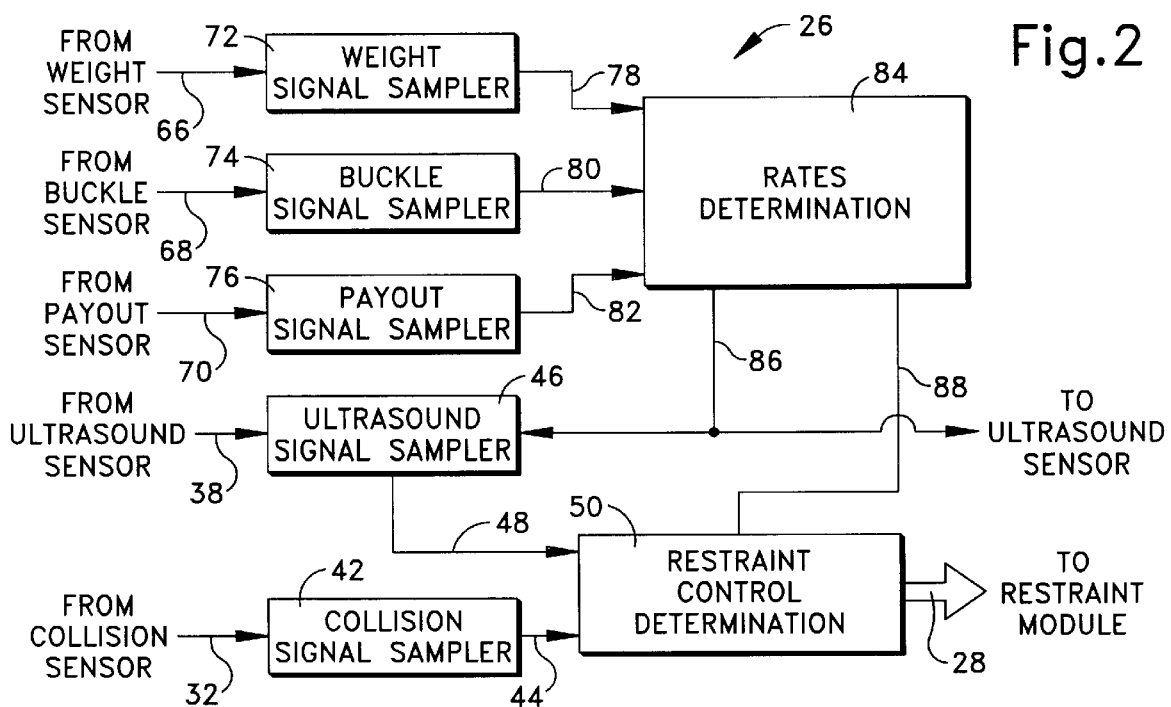
FIG. 2 is a schematic illustration of a portion of a controller shown within FIG. 1.

As shown in FIG. 2, the controller 26 includes a weight signal sampler function 72 which samples the signal 66 from the weight sensor 56. Each time the signal 66 is sampled, a weight indicative value of the signal 66 is "read." Preferably, the weight signal sampler is an internal analog-to-digital ("A/D") converter having a controllable sample or conversion rate. Sampling of the signal 66 by the weight signal sampler function 72 occurs at a fixed sample rate.

The controller 26 includes a buckle signal sampler function 74 which samples the signal 68 from the buckle sensor 58. Each time the signal 68 is sampled, a value indicative of whether the seat belt is secured is "read." The signal from sensor 58 is preferably a digital HIGH or LOW. Sampling of the signal 68 by the buckle signal sampler function 74 occurs at a fixed sample rate. The sampler function 74 is preferably a latch.

A payout signal sampler function 76 of the controller 26 samples the signal 70 from the payout sensor 60. Each time the signal 70 is sampled, a value indicative of the amount of withdrawn webbing is "read." Preferably, the signal 70 is a signal having a voltage value indicative of belt payout. Preferably, the signal 70 is connected to an A/D input of the controller 26. The controller controls the sample times of such A/D converter. Sampling of the signal 70 by the payout signal sampler function 76 occurs at a fixed sample rate.

The weight signal sampler function 72 outputs a signal 78 indicative of the read (i.e., sampled) value of the signal 66 from the weight sensor 56. The buckle signal sampler function 74 outputs a signal 80 indicative of the read value of the signal 68 from the buckle sensor 58. The payout signal sampler function 76 outputs a signal 82 indicative of the read value of the signal 70 from the payout sensor 60. The signals 78, 80, and 82 are provided to a rates determination function 84.

The signals 78, 80 and 82 are processed by the rates determination function 84, and based upon these signals, a sensor and sample rate for the ultrasound sensor 34 and the ultrasound signal sampler function 46 is determined and a determination rate for the restraint control determination function 50 is determined. The sensor/sample rate for the ultrasound sensor 34 and the ultrasound signal sampler function 46 is provided as an output 86 which is supplied to the ultrasound sensor and the ultrasound signal sampler function. The determination rate for the restraint control determination function 50 is provided as an output 88 which is supplied to the restraint determination control function 50.

The sample rates for the signals 66, 68, and 70 (i.e., weight and seat belt conditions) are preset to be relatively low. Accordingly, the process of sensing occupant characteristics to control other rates within the system 10 is not itself a burden on the processing system of controller 26.

Figure 5:
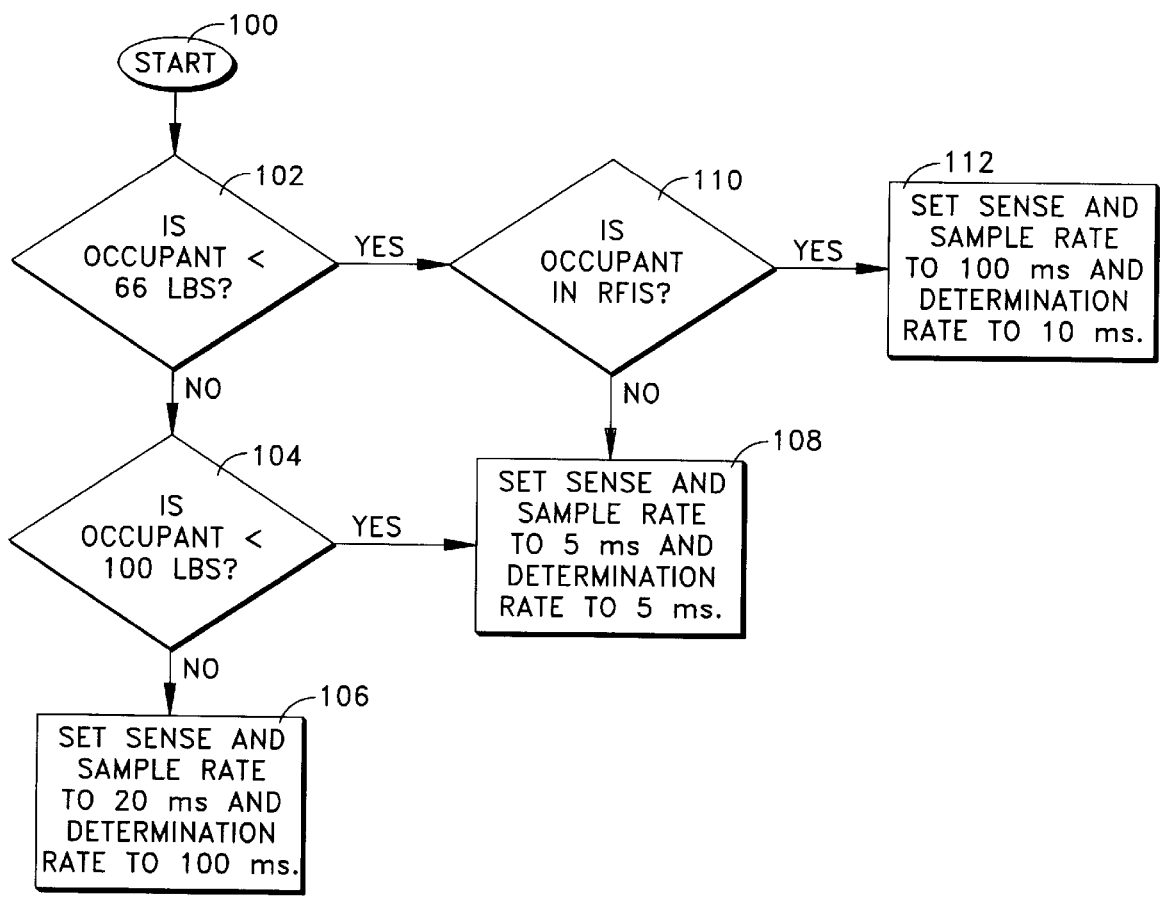
FIG. 5 is a flow chart showing a portion of a process in accordance with the present invention.

An example of a portion of a process performed within the rates determination function 84 is shown in the flow chart of FIG. 5. The illustrated portion of the process deals with the weight/size of the occupant and the type of occupant (e.g., an adult occupant or a child in the RFIS 54). It is to be appreciated that the process also has a portion which deals with the condition of whether the occupant is secured by the seat belt. The portion of the process dealing with the seat belt status effects the rates as a function of the seat belt status.

The portion of the process shown in FIG. 5 is initiated at step 100 and proceeds to step 102. At step 102, it is determined whether the occupant is under 66 lbs. An occupant under 66 lbs. is considered a small occupant. It should be noted that the sensed weight may include the combined weight of a small child and the RFIS 54 (FIG. 4). This combined weight results in the occupant being classified as a small size occupant.

If the determination at step 102 (FIG. 5) is negative, the process proceeds to step 104. At step 104, it is determined whether the occupant is under 100 lbs. An occupant with a weight of 66–100 lbs. is considered a medium size occupant and an occupant with a weight greater than 100 lbs. is considered a large size occupant. If the determination at step 104 is negative (i.e., the occupant is a large size occupant), the process proceeds to step 106. At step 106, the sense and sample rate of the sensor 34 and sampler function 46 is set at 20 milliseconds (ms) and the rate for determinations performed by controller 26 is set at 100 ms.

If the determination at step 104 is affirmative (i.e., the occupant is a medium size occupant), the process proceeds to step 108, wherein the sense and sample rate for sensor 34 and sampler function 46 is set at 5 ms and the determination rate is set at 5 ms. If the determination at step 102 is affirmative (i.e., the occupant is a small size occupant), the process proceeds to step 110. At step 110, it is determined whether the small size occupant is in a RFIS. If the determination at step 110 is negative, the process goes to step 108, wherein the sense and sample rate is set at 5 ms and the determination rate is set at 5 ms. If the determination at step 110 is affirmative, then the process goes to step 112, wherein the sense and sample rate is set at 100 ms and the determination rate is set at 10 ms.

From the above description of the invention, those skilled in the art will perceive improvements, changes and modifications. For example, the sense and sample rate and/or the determination rate could be set using only information regarding the weight of the occupant or only the status of whether the occupant is secured by the seat belt. Also, the sense rate may be set different than the sample rate, or not set at all (e.g., the sensor is "ON" at a constant rate). Such improvements, changes and modifications within the skill of the art are intended to be covered by the appended claims.

Having described the invention, the following is claimed:

1. An occupant restraint system for a vehicle, said system comprising:

an actuatable occupant restraint device;

first sensor means for sensing a first occupant condition at a sense rate and for providing a sensed signal indicative of the first sensed occupant condition;

means for sampling said sensed signal at a sample rate;

determination means for making determinations regarding control of said restraint device at a determination rate using the signal samples;

second sensor means for sensing a second occupant condition; and variation means for varying at least one of said sense rate, said sample rate and said determination rate in response to the second sensed occupant condition.

2. A system as set forth in claim 1, wherein the second occupant condition is an occupant characteristic, and said second sensor means includes means for sensing the occupant characteristic.

3. A system as set forth in claim 2, wherein the occupant characteristic is occupant weight.

4. A system as set forth in claim 1, wherein the second sensed occupant condition is a status of whether the occupant is secured by a seat belt.

5. A system as set forth in claim 1, wherein the second sensed occupant condition is a status of whether the occupant is a child in a child seat.

6. A system as set forth in claim 1, wherein the first sensed occupant condition is different from the second sensed occupant condition.

7. A system as set forth in claim 1, wherein said variation means varies said sample rate and said determination rate.

8. A system as set forth in claim 1, including third sensor means for sensing a third occupant condition, and wherein said variation means includes means for varying at least one of said sense rate, said sample rate and said determination rate in response to the third sensed occupant condition.

9. A system as set forth in claim 1, wherein said restraint device has at least one adjustable aspect, said determination means includes means for making determinations regarding adjustment control of said restraint device.

10. A system as set forth in claim 1, wherein said first sensor means includes means for transmitting a signal toward an occupant position and means for receiving a reflected signal from the occupant location.

11. A system as set forth in claim 10, wherein said first sensor means includes an ultrasound sensor.

12. A method for controlling an actuatable occupant restraint device of an occupant restraint system for a vehicle, said method comprising:

sensing a first occupant condition at a sense rate;

providing a sensed signal indicative of the first sensed occupant condition;

sampling the sensed signal at a sample rate;

making determinations regarding control of the restraint device at a determination rate using the signal samples;

sensing a second occupant condition; and varying at least one of the sense rate, the sample rate and the determination rate in response to the second sensed occupant condition.

13. A method as set forth in claim 12, wherein the second occupant condition is an occupant characteristic.

14. A method as set forth in claim 13, wherein the occupant characteristic is occupant weight.

15. A method as set forth in claim 12, wherein the second sensed occupant condition is a status of whether the occupant is secured by a seat belt.

16. A method as set forth in claim 12, wherein the second sensed occupant condition is a status of whether the occupant is a child in a child seat.

17. A method as set forth in claim 12, including sensing a third occupant condition, and varying at least one of the sense rate, the sample rate and the determination rate in response to the third sensed occupant condition.

* * * * *